FIG. I.

INVENTOR
O.H.A. Lammert

INVENTOR
O. H. A. Lammert

Oct. 13, 1964   O. H. A. LAMMERT   3,152,679
APPARATUS AND CONVEYOR SYSTEM FOR PROCESSING PLANTS
Filed April 12, 1962   8 Sheets-Sheet 6

INVENTOR
O. H. A. Lammert
BY Wilkinson, Mawhinney & Theibault
ATTORNEYS

Oct. 13, 1964    O. H. A. LAMMERT    3,152,679
APPARATUS AND CONVEYOR SYSTEM FOR PROCESSING PLANTS
Filed April 12, 1962    8 Sheets-Sheet 7

INVENTOR
O.H.A. Lammert

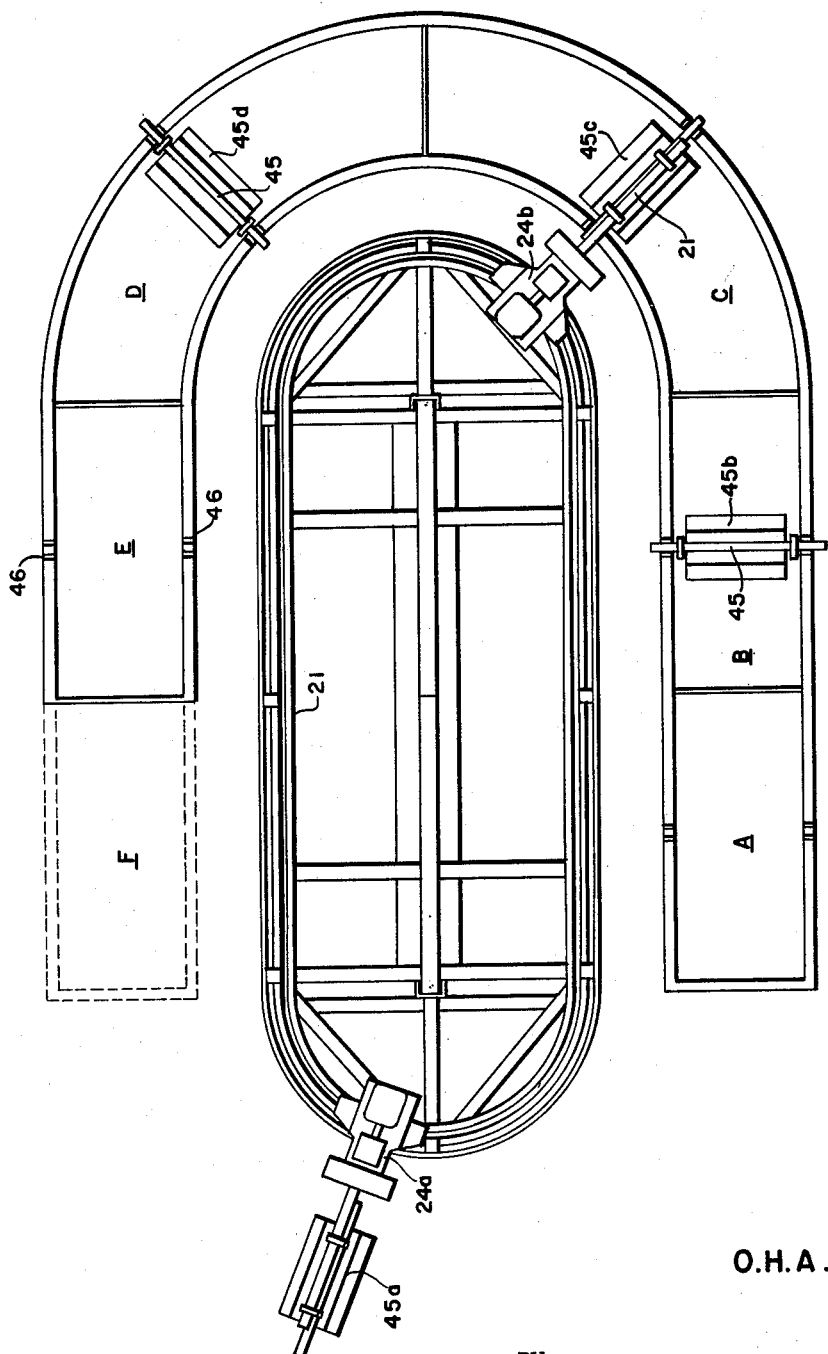

United States Patent Office 3,152,679
Patented Oct. 13, 1964

3,152,679
APPARATUS AND CONVEYOR SYSTEM FOR PROCESSING PLANTS
Otto H. A. Lammert, % O. H. Lammert Aktiebolag, Molndal, Sweden
Filed Apr. 12, 1962, Ser. No. 186,949
Claims priority, application Germany Apr. 18, 1961
10 Claims. (Cl. 198—19)

The present invention relates to apparatus and conveyor system for processing plants, and has for an object to provide a motorized carriage capable of performing two functions, namely, that of vertically elevating work to be treated into and out of the treatment solutions and for conveying the work to be treated horizontally along a line of treatment stations for successive or skip-type treatments. With the motorized carriage of the present invention a minimum number of motorized carriages may be employed in the handling of a large number of articles to be treated at a plurality of treatment stations.

The present invention provides an installation that is operated automatically and which makes it possible with the aid of a motor to effect the vertical movement of the work supporting bracket as well as the horizontal movement of the bracket and the carriage to which it is secured. This problem is solved in accordance with the present invention by means of an automatically reversible motor for driving the carriages and for carrying out the raising and lowering of the supporting bracket carried by the main carriage. By constructing the conveyor system of this invention in this manner it is possible to dispense with the previously required chain drives for the carriages. These are now moved by a single electric motor whereby when the carriage arrives opposite a certain treatment bath the forward motion of the carriage is arrested by a suitable reversal of the electric motor whereupon the downward movement of the supporting bracket takes place and the articles to be treated are lowered into the treatment bath. At the end of the dipping cycle the supporting bracket by the same electric motor is again run upwardly whereupon the forward movement of the carriage in the runway is allowed to continue.

A further object of the present invention is to provide between the motor and drive mechanism for the carriages and the supporting bracket, a coupling device which is capable of connecting, depending upon the direction of rotation of the motor, either the carriage or the supporting bracket with the motor. More particularly it connects the motor at one time to allow a hollow shaft having an endless external thread on which a nut-like holder for the bracket having an internal thread can be placed, while on the other hand it connects the motor to a shaft arranged within said hollow shaft which at its end opposite the coupling device is provided with a chain or sprocket wheel, rubber roller or the like cooperating with a suitable device that permits the carriage to partake of horizontal movement along the line of treatment stations. By this arrangement each of the carriage devices is provided with a single electric motor which is capable of effecting simultaneously the forward movement of the carriages within the runway as well as the raising and lowering of the supporting bracket.

A further object of the present invention is to provide an improved form of work carrying bracket to be secured to a roller assembly carried by the carriages and to be raised and lowered, and which can engage and disengage the containers containing the articles to be treated whereby, for example, if a plurality of articles are contained in a foraminous barrel the barrel may be placed into a treatment tank and the bracket and its associated elements disconnected from contact with that particular barrel, the bracket elevated and the carriage moved over a different barrel for either purposes of picking up the barrel or setting it down or for purposes of skipping one barrel over another barrel in the treatment cycle.

A still further object of the present invention is the provision of a system whereby it is possible to run any preset program with a relatively small number of carriages and an exceedingly small expenditure in mechanical and electronically controlled devices for programming the carriages.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 11 is a top plan view of a return type article treatment apparatus employing the carriages of the instant invention.

Figure 1:
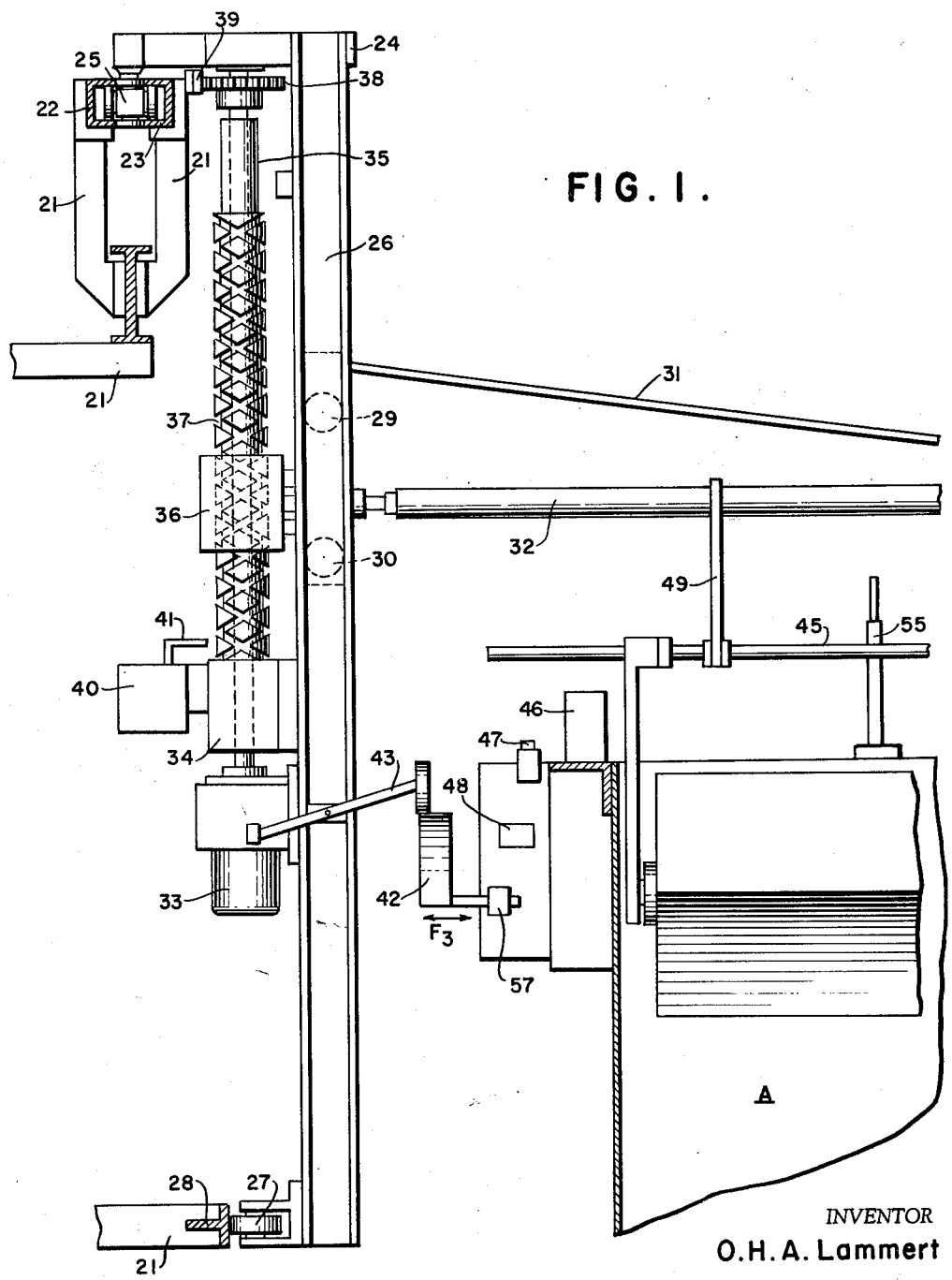
FIGURE 1 is a side elevational view, with parts broken away and parts shown in section of a conveyor and elevator carriage on a static frame of an article treating system in accordance with the present invention.

Referring more particularly to the drawings, and for the moment to FIGURE 1, the reference numeral 21 indicates a part of the framework which serves as a support for the conveyor system. At the upper crossarm of framework 21 there is arranged a guide rail consisting of two U-shaped girders 22 and 23 which serves to accommodate the transfer carriage 24 proper. The transfer carriage 24 runs over a roller arrangement 25, constructed in a known manner per se, in guide rails 22 and 23 and is provided, at side opposite of the roller arrangement 25, with a guide rail 26 which is fastened at its upper end to transfer carriage 24 and has at its lower end a tappet roller 27 which cooperates with a suitable impact plate 28 secured to framework 21, thereby providing a means to prevent the tilting of guide rail 26. In the guide rail proper slides the supporting bracket 31 guided by runners 29 and 30, said bracket extending at a right angle away from guide rail 26 and reaching with its supporting arm 32 over the treatment baths. Of these treatment baths there is shown diagrammatically a part of bath A in FIGURE 1.

On the side of the guide rail 26 that is opposite to the supporting bracket there is located at the lower end thereof a current supply of conventional type which is not represented in the drawing and may have a structure which is per se within the knowledge of the art. An electric motor 33 is arranged above said current supply on guide rail 26 and is connected to a coupling device 34. Above the coupling device 34 is provided a cylinder 35 which is in the form of a hollow shaft and has an endless thread cut into its outside which permits vertical sliding movement thereon of holder 36 which has a corresponding interior thread. The supporting rod 32 of bracket 31 extends between guide rail 26, which is shown in the drawing, and an identical guide rail located in the rear thereof which is not represented in FIGURE 1 and is secured to holder 36. From the foregoing description it is at once apparent that upon moving the holder 36 up and down the supporting bracket guided through runners 29 and 30 will move up and down in the rails 26.

A shaft 37 is provided in cylinder 35 the lower end of which is connected to the coupling device 34 whereas its upper end has a gear wheel 38, as exemplified in the drawing, which meshes with a corresponding toothed track 19 which is rigidly secured to the arrangement that receives the U-shaped girders 22 and 23 at its side opposite to the guide rails 26. It is readily apparent that with a rotation of shaft 37 the gear wheel 38 meshes with toothed track 39 and that as a result of this the transfer carriage 24 can be run horizontally through the runway formed by girders 22 and 23.

The coupling device 34 consists essentially of two parts which are connected with each other in such a way that if the motor runs counterclockwise the shaft 37 is connected to the motor and the transfer carriages 24 are moved horizontally, whereas if the motor runs clockwise the cylinder 35 is connected to the motor 33 which causes the supporting bracket 31 to move up and down.

A time-responsive relay 40 is inserted in the current supply line to the motor 33 which can be actuated by holder 36. When the holder 36 on cylinder 35 is run downward it will engage at the lower end of its travel switch contact 41 thereby interrupting the current supply to motor 33. In accordance with the period that the time relay is set for, the current supply to the motor 33 is reinstated after the elapse of such period and by this means the holder 36 is again able to move upwardly.

The reversal of motor 33 is effected with the aid of an adjustable stop mechanism 42 which cooperates with the terminal switch or control feeler 43. The arrangement is constructed in such a way that when the stop mechanism 42 is in the position shown in FIGURE 1, the control feeler 43 is lifted, as its head 56 runs up against stop 42, thereby reversing the motor. The latter, which previously turned counterclockwise and thus made it possible for carriage 24 to move forward horizontally, is now rotating clockwise with the result that such forward movement is arrested since the shaft 37 is disconnected by the coupling device 34 and thus establishes the connection with cylinder 35, whereby either the lifting or the lowering movement of holder 36 and by it that of the supporting bracket 31 is initiated.

Figure 8:
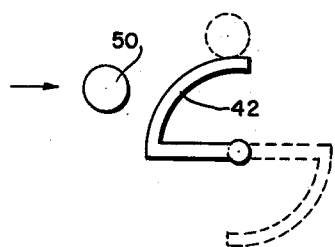
FIGURE 8 is a diagrammatic view of the adjustable stop mechanism employed in releasing the article to be treated from the article carrying arm of the carriage of the present invention.

The construction of stop mechanism 42 is shown on a larger scale in FIGURE 8. The heavy lines in this figure show the position of this stop mechanism as it is represented in FIGURE 1, that is the head 56 of control feeler 43 is moved forward in the direction of arrows F and slides upon the runner of stop 42 which is suitably shaped as a ramp-like surface. This effects the reversal of the motor 33.

Figure 9:
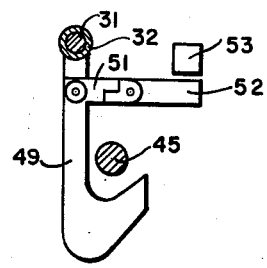
FIGURE 9 is a sectional view through a coupling device for the carrying arrangement which receives the articles to be treated.

The articles to be immersed into the treatment bath A are suspended on a supporting rod 45 which in turn engages the rod 32 of bracket 31 with the aid of holding devices 49 as shown for example in FIGURE 9. When the rod 45 comes to rest on supporting horses 46 associated with treatment bath A, this will actuate a control switch 47 by means of which the suitably preset time relay 48 is put into service and the movable stop mechanism 42 is rotated to the position shown by the dotted lines in FIGURE 8. The stop mechanism 42 remains in this position until the time relay 42 has run off. The running off of the time relay generates a pulse by means of which the stop is again returned to the position shown in FIGURE 1.

The supporting device for the rods 45 shown in FIGURE 9 consists of a hook 49 which is fastened to rod 32 through the agency of a suitable supporting rod 50. The hook 49 is secured to rod 50 through the intermediary of a joint and has a projection 51 extending at a right angle to its longitudinal extension and which is associated with a lever arm 52, also through the intermediary of a joint, and is provided with a stop 53. As the hook 49 is lowered the lever 52, just before the lowermost position of hook 49, hits against stop 53 which operates to lift the lever 52 until part 52 of the lever slides past stop 53. If the articles that are suspended on rod 45 are to remain in the treatment bath for a longer period and it is desired to release the supporting bracket 31 from the articles, in the course of raising the hook 49 the lever 52 will be held by the bottom part of stop 53 thereby causing the lever to swing out in the direction of arrow $F_2$. If, contrary to this possibility, the lever 49 is not to be released from rod 45 during the period in which the articles are treated in the bath, the hook will be lowered only to such an extent that the lever 52 will continue to hug the upper part of stop 53 so that the hook is prevented from swinging out in the direction of arrow $F_2$. As the hook 49 is raised it will be pulled in a straight upward direction and the lever 52 will not function to cause the swinging out movement.

The operation of the device according to the invention is as follows: The transfer carriages 24 are positioned in rails 22 and 23 in the so-called loading zone of the conveyor system, the motor 33 is started by suitable switching and, since at this point the control feeler 43 is in a position opposite to that shown in FIGURE 1, the shaft 37 is rotated, gear wheel 38 meshes with toothed track 39 so that the transfer carriages 24 are moved forward horizontally. When the control feeler or terminal switch 43 arrives at a stop 42 opposite a treatment bath A, it will slide onto the stop as shown in FIGURES 1 and 8. This movement reverses the motor 33 which now revolves in the opposite direction, with the result that the corresponding coupling parts no longer engage shaft 17 but connect cylinder 35 with motor 33 so that the holder 36, which was in its upper position during the forward motion of carriage 24, unscrews itself in downward direction thereby lowering the supporting bracket 31. As the supporting bracket 31 with the articles to be treated suspended therefrom reaches horse 46, the holder 36 at the same time contacts the switch 41 thereby actuating the time relay 40 and interrupting the current supply to motor 33. The motor 33 and the entire lift-over arrangement are, therefore, at a standstill during the treatment period. After the time relay has run out, the current supply to motor 33 is again restored and, since the control feeler 43 is still lying on stop 42, the cylinder 35 is rotated and the holder 36 as well as supporting bracket 31 with the articles suspended on rod 45 are moved upwardly. At the upper end of its travel, the holder 36 contacts a control switch 54. This causes polarity reversal in motor 33 as a result of which the shaft 37 is again rotated and gear wheel 38 meshes with toothed track 39. The transfer carriage 24 is thereby caused to move forward and the control feeler 43 is disengaged from stop 42.

If the articles are to remain in the treatment bath for a longer period, the hook 49, by being lowered some more and by the interaction of lever 52 and stop 53, is caused to swing out in the direction of arrow $F_2$ so that at this point only the rod 45 comes to rest on horse 46. This actuates the contact 47 which functions to put the preset time relay 48 into service and at the same time effects the swinging of stop 42 into the position indicated by the dotted lines in FIGURE 8. For this type of operation the time delay 40 was preset in such a way that notwithstanding the touching of contact 41 by holder 36, the current supply to motor 34 was not interrupted. By swinging the stop 42 to its downward position it is possible to actuate the control feeler or limiting switch 43 which now reverses the polarity of the motor thereby driving shaft 37 instead of cylinder 35. This causes the supporting bracket 31 to be moved forward in a horizontal direction. It is then capable of grasping a supporting rod 45 which rests on the next adjacent tank and which at this point has immersed the articles into the treatment bath for a sufficient length of time. In the course of this operation, by suitable switching of the stop mechanism and of the time relay, the supporting bracket 31 is moved upwardly so that the initial position is again occupied. However, if the supporting bracket 31 is to be returned to its upward position directly from the first treatment bath, it is possible by suitable presetting of time relay 40 and time relay 48, and by the resulting time lag in the actuation of stop mechanism 42, to effect first the upward movement of holding device 36 before the transfer carriage 24 is moved forward in a horizontal direction either by switching across terminal switch 54 or by the tipping of the stop mechanism 42 and the rotation of shaft 37.

In an automatic arrangement of this type it is possible that, as a result of a control failure, a supporting bracket 31 loaded with articles is lowered over a treatment bath A in which a rod 45 is already deposited on horse 46. In order to avoid such collisions there are provided at the treatment bath one or more control feelers 55 which, upon contacting the articles suspended from the supporting column 31, close a circuit and thereby actuate a switch 57 which operates to move the stop mechanism in a horizontal direction as indicated by arrow $F_3$ in FIGURE 1. In this way the stop mechanism 42 is automatically withdrawn from the control feeler 43 and the latter is actuated so as to effect a reversal of motor 33 by means of which the transfer carriage 24 is moved forward in a horizontal direction.

Figure 2:
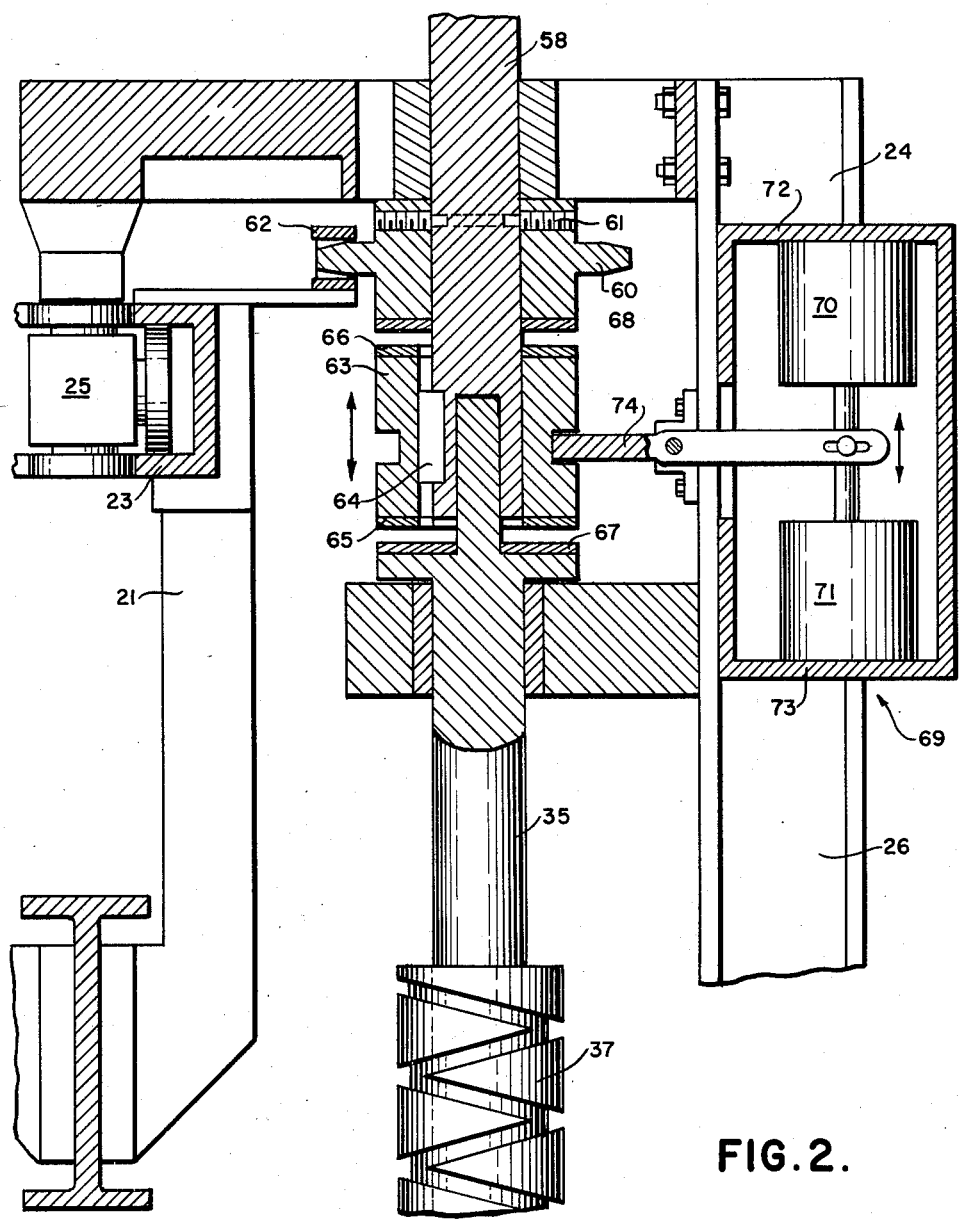
FIGURE 2 is a vertical sectional view with parts broken away and parts shown in section of a modified form of conveyor and elevator drive employed with the device of FIGURE 1.

Referring now to FIGURE 2, a modified form of coupling device for coupling the endless worm shaft 37 to the driving motor is shown.

The worm 37 having a simple thread is supported at the upper end of motor shaft 58 of motor 59. The worm 37 receives the supporting bracket for the articles to be immersed into the treatment bath, whereby said supporting bracket, which is not shown in the drawing, with the aid of a nut-like device screws itself up and down worm 37.

While the drawing has shown the driven shaft 58 directly connected to motor 59 which may be an electrically driven motor, it is obviously possible to insert between shaft 58 and motor 59 a normal coupling device which would permit disconnecting the whole drive mechanism from all the driven devices. On the driven shaft 58 of motor 59, which is directed downwardly in accordance with this embodiment of the invention, there is provided a cog wheel 60 which, with the aid of a slot and key arrangement 61 which is per se within the knowledge of the art, is rigidly held on driven shaft 58 against rotation in the axial direction of the shaft, but is otherwise free to rotate on this shaft. Cog wheel 60, which constitutes the drive wheel for driving the carriages in a horizontal direction, meshes with a suitably constructed toothed rack 62, whereby it is of cource possible to use instead of the cog wheel and the toothed rack a corresponding sprocket wheel and a corresponding chain rack.

The coupling mechanism 63 proper is shown below the cog wheel 60. It is secured on shaft 58 and held against rotation thereon with the aid of slot and key arrangement 64, but is capable of being displaced in the axial direction of the shaft, the extent of this displacement corresponding to the length of the slot. The two lower and upper surfaces 65 and 66 of this coupling device are formed in such a way that a transmission of motion, either to the cog wheel 60 or to the worm 37, is obtained by providing the frontal areas of these two members that are directed toward the coupling member 63 with corresponding surfaces 67 and 68. These surfaces may, for example, have the shape of simple gear rims, or they may be fitted with the usual clutch facings used in the automotive industry which insure an efficient joint between the rotating parts being connected.

Immediately adjacent to coupling member 63 there is shown, in accordance with the present embodiment, a control device 69 operating, for example, through armatures 70 and 71 which are arranged within suitable windings 72 and 73. The armatures 70 and 71 are in contact, through connection 74, with coupling member 63. With this arrangement, a movement of the two armatures 70 and 71 in the direction of arrow F also moves coupling member 63 in the same direction which thus establishes a contact with one of the two parts 37 or 60.

The operation of the device in accordance with the present invention is as follows: For example, if the winding 72 is energized by a suitable current impulse, the armature 70 is attracted which causes the coupling member 63 to slide upwardly on shaft 58, so that the surfaces 66 and 68 of members 63 and 60 contact each other and thus rigidly connect the cog wheel 60 with the driven shaft 58 of motor 59. It is apparent, that the direction of rotation imparted to cog wheel 60 is directly dependent upon the direction of rotation of motor 59, this motor 59 being of course capable of rotating in both directions in the usual manner. By driving cog wheel 60 which meshes with toothed rack 62, it is therefore possible to horizontally move forward or backward the actual supporting carriage for the whole system.

When the armature 71 is retracted by the energization of coil 73, the coupling member 63 moves against worm 37 and the surfaces 67 and 65 come in contact as a result of which the supporting bracket for the articles to be treated is moved up or down depending on the rotational direction of the motor.

Figure 3:
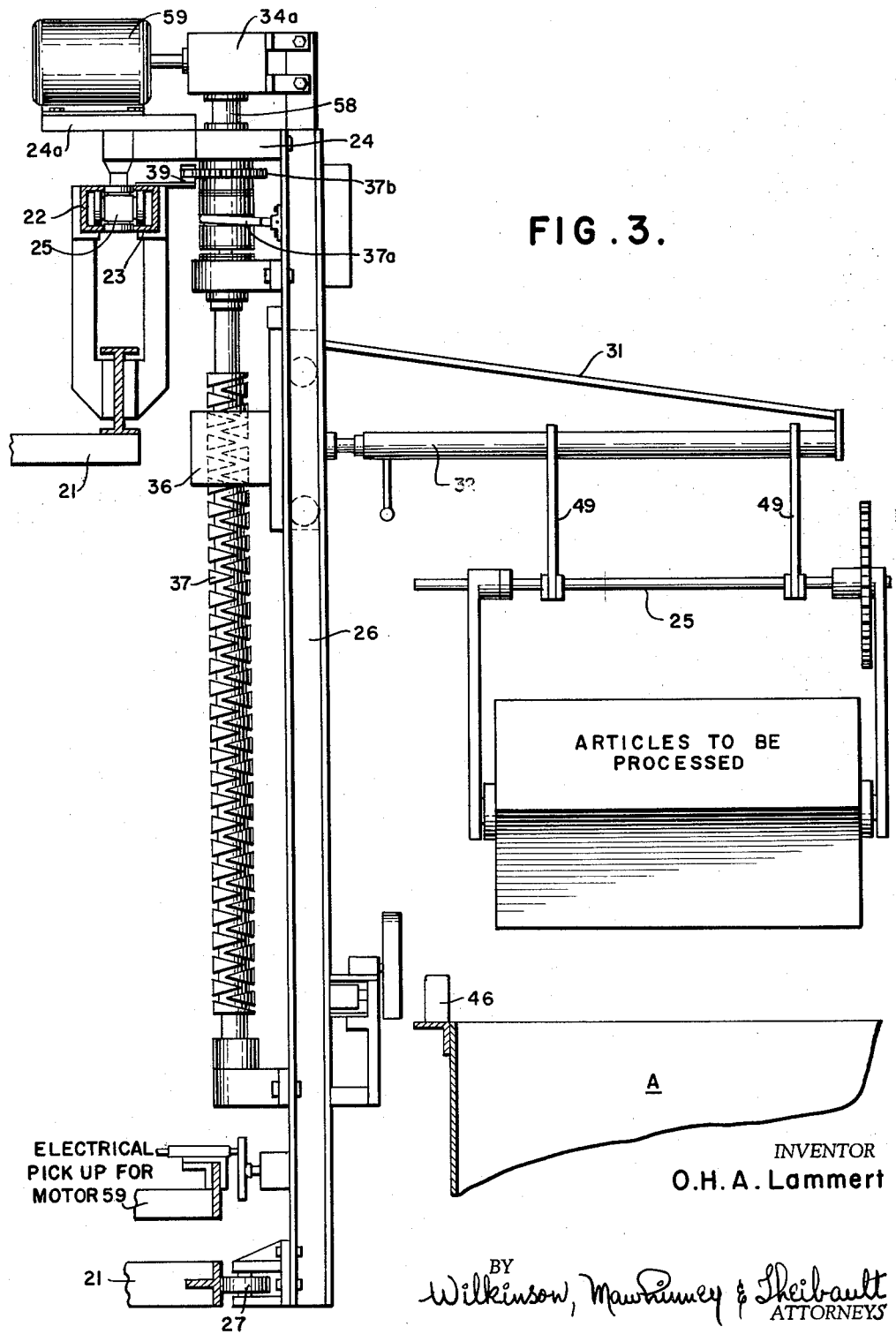
FIGURE 3 is a side elevational view, with parts broken away and parts shown in section of a modified form of conveyor and elevator carriage on a static frame of an article treating system in accordance with the present invention.
Figure 4:
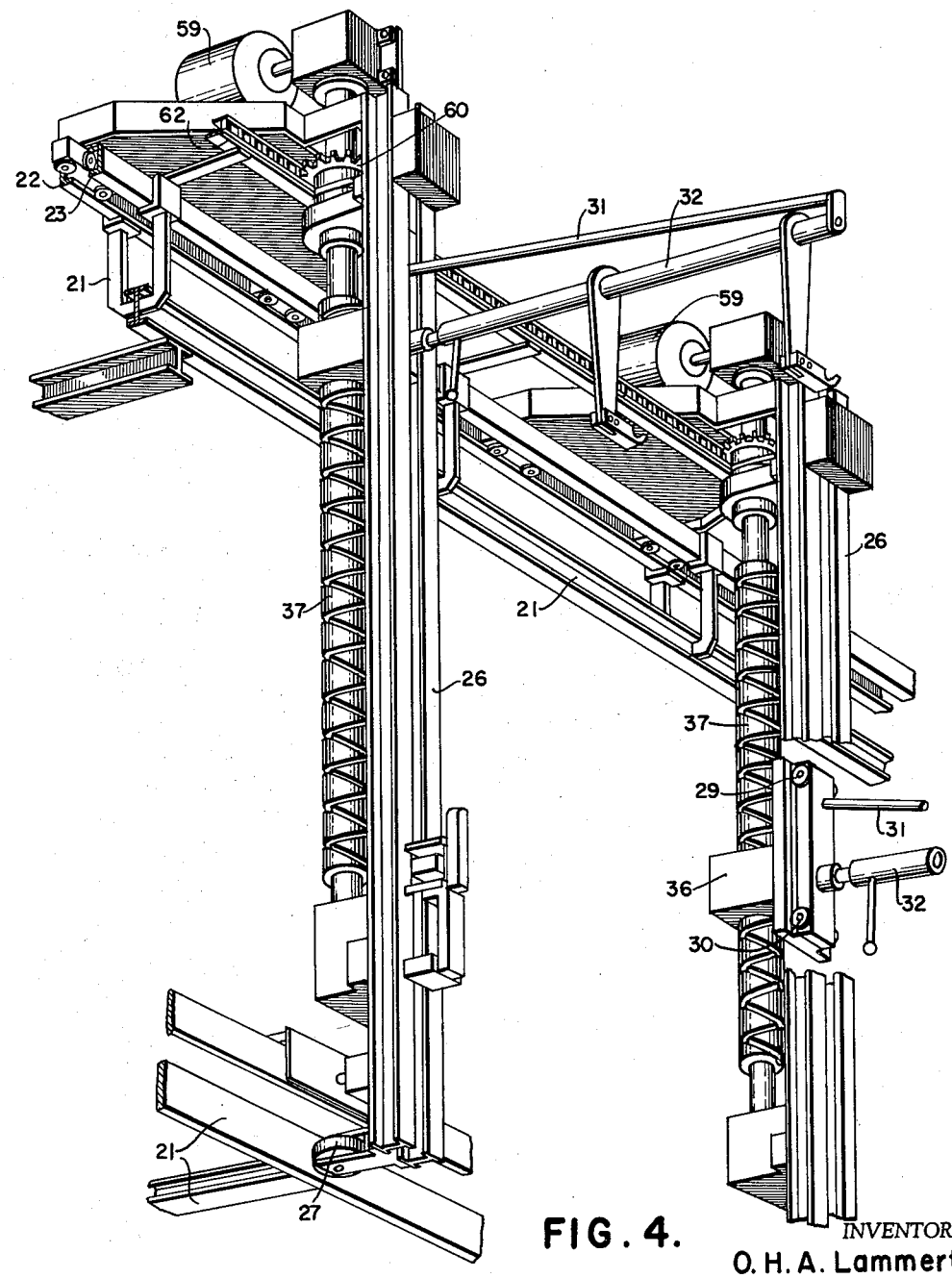
FIGURE 4 is a fragmentary bottom perspective view with parts broken away and parts shown in section of an apparatus constructed in accordance with the form of the invention of FIGURE 3.
Figure 5:
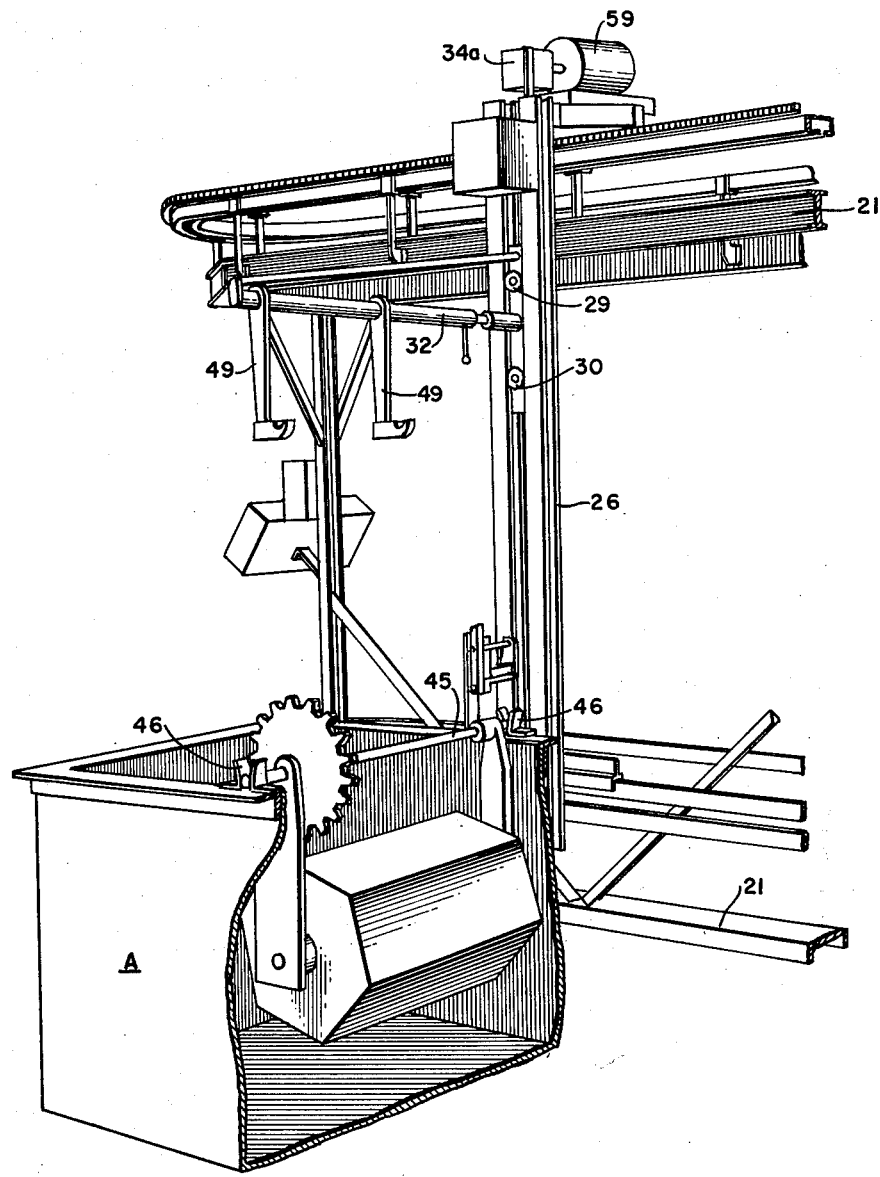
FIGURE 5 is a fragmentary perspective view with parts broken away and parts shown in section of an apparatus constructed in accordance with the form of invention of FIGURES 3 and 4.

Referring to FIGURES 3 through 5 inclusive, a modified form of carriage is illustrated wherein the top of the carriage 24 has a plate 24$^a$ for supporting an electric motor 33$^a$ thereon. The electric motor 33$^a$ through a right angle drive 34$^a$ is coupled to the endless worm shaft 37 and is under the control of an electronically shifted yoke 37$^a$ for selectively driving either the shaft 37 for raising and lowering the work carrying arm 32 or engaging a drive sprocket 37$^b$ with the toothed track 39 for compelling the carriage to be moved horizontally when the rack 31 is in the fully raised position.

As best seen in the bottom perspective view in FIGURE 4, one of the carriages has its work carrying arms and hooks in the fully raised position while the other has its work carrying arms in the fully lowered position.

As best seen in FIGURE 5, a plating barrel has been deposited upon the top walls of the treatment tank and the hooks have disengaged the barrel support. The supporting bracket 31 and arm 32 have been raised to the fully raised position and the carriage is now ready to proceed along to the next station where it will pick up work from the tank and deposit it into another tank.

Figure 6:
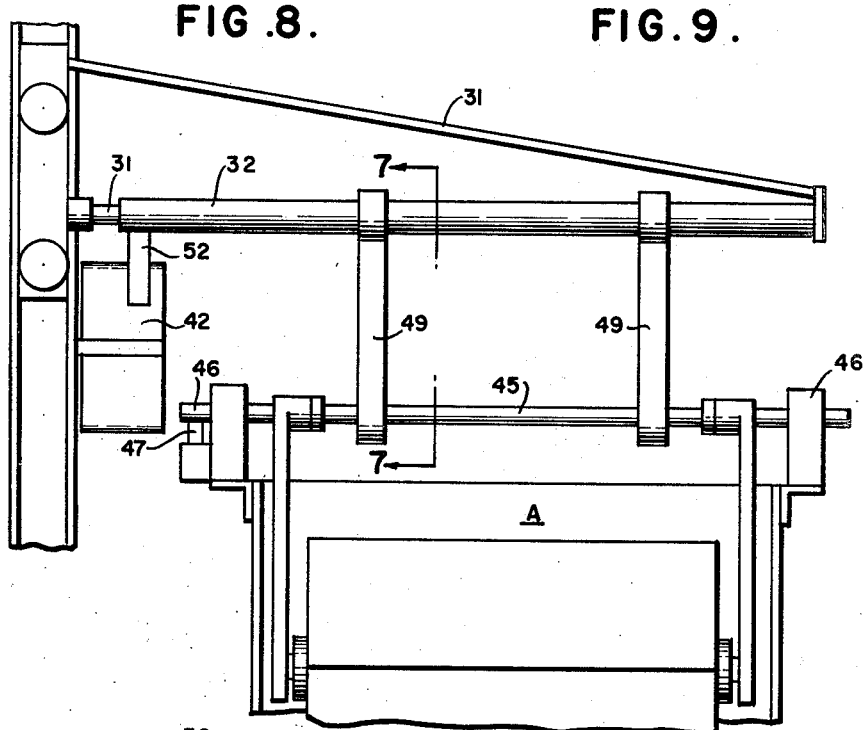
FIGURE 6 is a transverse view of an article carrying side arm on a carriage constructed in accordance with the present invention wherein the article being carried is being deposited at a treatment station.
Figure 7:
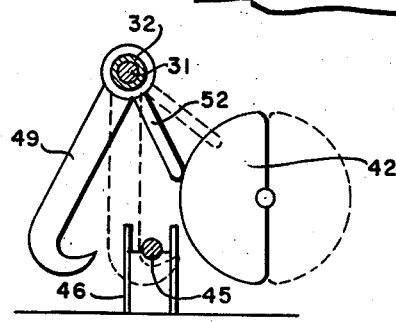
FIGURE 7 is a sectional view taken on the line 7—7 of FIGURE 6.

Referring now to FIGURES 6 and 7, the supporting bracket 31 running in guide rail 26 has a rod 32 which is provided with a sleeve 32$^a$ that is rotatably fastened thereon. The rocking lever 52 and hooks 49 are rigidly secured to this sleeve. The hooks 49 carry the article holder 45 which can be placed on horses 46 of the treatment bath A. The treatment bath is also provided with a switch 47 which is actuated as the article holder is placed thereon and controls a magnetic switch 44 which has a sliding face that is destined to contact the rocking lever 52.

Upon lowering the supporting bracket 31, the article carrier 45 held by hook 49 will engage contact 47 which in turn actuates contact 44 arranged within range of rocking lever 52 in such a way that the sliding face $b$ of this contact is displaced or turned about to such an extent that, as the supporting bracket 31 travels backward, the rocking lever 52 is forced to swing outwardly, which has the effect of simultaneously rotating the hooks and moving them out of contact with rod 45. The operation of this arrangement essentially corresponds to that shown in FIGURE 1 except for the fact that the release of the hooks 49 from rod 45 is achieved by means of contact 44 which is electrically actuated through switch 47. The contact 44 can be constructed in such a way that, after a short period, the sliding face $b$ by the action of a suitable time relay is either withdrawn or rotated to such an extent that the movement of the rocking lever 52 is no longer interfered with. It is important to note, in this connection, that sliding face $b$ must be in a position of rest when the next supporting bracket 31 is lowered over the container for the purpose of grasping the previously deposited rod 45. Since the contact 47 is not actuated again, it follows that also contact 44 remains inactive so that the contact 44 being in a position of rest, it is now possible to effectively grasp the article holder.

Figure 10:
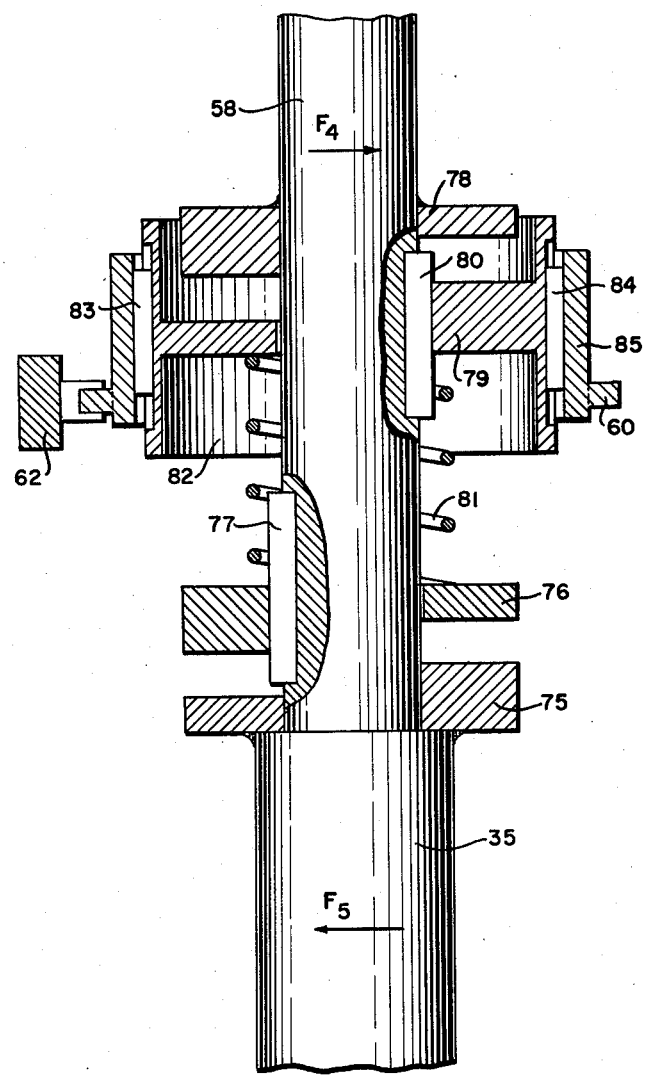
FIGURE 10 is a fragmentary vertical sectional view taken at an enlarged scale of a modified form of coupling device for coupling the electric motor to the endless worm shaft.

Referring now to FIGURE 10, the reference numerals are, as far as possible, the same as those used in the drawing of FIGURE 1. Thus, numeral 35 is used to designate the actual hollow shaft that receives the motor shaft 58 which can freely rotate in hollow shaft 35. In the upper part of the arrangement there is provided a cog wheel 60 which meshes with the corresponding toothed rack 62 shown in FIGURE 2 and which, upon being driven, permits the forward movement of the carriage 24 in a horizontal direction.

At the upper end of hollow shaft 35 there is provided a disc 75 which is rigidly connected with hollow shaft 35. A disc 76 is provided on motor shaft 58 directly above disc 75 and is movable on the motor shaft in the axial direction of the shaft as a result of being rigidly connected as to rotation with shaft 58 with the aid of a slot and key arrangement 77. At the upper end of motor shaft 58 there is rigidly connected a disc 78 to which is assigned disc 79. This disc which is constructed in the same manner as disc 76 is also longitudinally movable by a spline arrangement 80 along motor shaft 58 but rigidly held against rotation. Between the two discs 79 and 76 there is provided a coiled spring 81 which tends to move the two discs 79 and 76 into contact with driving discs 78 or 75 assigned to them.

At the periphery of disc 79 there is fitted a sleeve 82 which is provided with exterior slot and key arrangements 83 and 84. A second sleeve 85 is fitted around sleeve 82 and is rigidly connected therewith against rotation through slot and key arrangements 83 and 84. However, with this arrangement the sleeve 82 is still movable in axial direction. Cog wheel 60 is provided at the outside of sleeve 85 for engagement with a toothed rack which is not shown in the drawing.

The operation of the device according to the invention is as follows:

Upon rotating motor shaft 58 counterclockwise in the direction of arrow $F_4$, the disc 79, due to its surface configuration, engages the surface of disc 78 and is, therefore, rotated together with shaft 58 and, as a result, also cog wheel 60 is caused to rotate and by its meshing with the toothed rack the carriage is now moved forward in horizontal direction. When shaft 58 is driven in this direction, disc 76 will be disengaged from disc 75 and this has the effect of arresting hollow shaft 35. By this arrangement it is possible to constantly hold cog wheel 60 in a fixed position in the toothed rack or the corresponding chain-like device, whereas the sleeve 82 is free to move within sleeve 85 and the axial direction of the shaft. If the motor is now reversed and the motor shaft 58 rotated in the direction of arrow $F_5$, the disc 79 becomes separated from its engagement with disc 78. At this point, the disc 76 moves to engage disc 75 and, as a result, also the hollow shaft 35 is driven in the direction of arrow $F_5$, which will permit the supporting bracket proper to move up and down.

The surfaces of discs 75, 76 and 78 as well as 79 can be made in the form of a ratchet mechanism or they may be provided with suitable spring devices, for example leaf springs, which make it possible to obtain in one direction of rotation of the driving disc the attraction of the driven disc, while obtaining in the other direction of rotation the separation of the driven disc from the driving disc.

Referring particularly to FIGURE 11, a plurality of treatment tanks and treatment stations bearing the letters A through F are shown in an inverted horseshoe type arrangement. It will be noted that the static frame 21 is shown in the form of a closed circuit type structure of the return type machine well known in this art.

In the form of apparatus shown in FIGURE 11, two carriage units 24A and 24B are shown. It will be noted that carriage 24A has picked up from a load station a barrel of articles to be processed 45A and that the carriage will progress around the end of the machine counter-clockwise to deposit the barrel 45A at station A in such a way that the carrier 45 will be received by the horses 46 at station A. The carriage 24A will then cause the lifting bracket 31 to be elevated and upon reaching its upper limit of elevation it will be moved horizontally to station B where it will pick up barrel 45B. The carriage 24B is shown at station C where it is in the process of picking up barrel 45C containing articles being processed. The carriage 24B will then proceed past station D and will actually pass over the barrel 45D immersed in the treatment solution and will deposit the barrel 45C at station E. By this time the carriage 24A may then proceed to pick up barrel 45D and, for example, take it to station F. By this time the carriage 24B has come around past the loading zone and picked up a barrel to be placed in station B. It will be noted that with only two carriages the entire article treatment tank area can be serviced either in seriatim or in a skip-stop process whereby certain barrels may be left in certain treatment stations for a longer period than in others. Greater flexibility of a plating system is attained with the apparatus of the present invention since fewer carriages than stations may be employed and the carriages may be run forwardly or rearwardly to pick up or deposit as the programming of the electrical circuit may require.

Although I have disclosed herein the best forms of the invention known to me at this time, I reserve the right to all such modifications and changes as may come within the scope of the following claims.

What is claimed is:

1. For use with a plurality of treatment stations having
   (a) a track adjacent thereto,
   (b) a carriage mounted on said track for movement therealong,
   (c) a self-contained drive means on said carriage,
   (d) work support means carried by said carriage and being movable vertically within said carriage,
   (e) means for raising and lowering said work support up and down in said carriage, and
   (f) control means for selectively energizing said drive means for moving said carriage along said track in one position and for elevating and lowering said work support with respect to said carriage in the other position.

2. An apparatus as claimed in claim 1 wherein said carriage is carried by said track and
(g) has guide means extending down one side thereof in which said work support is mounted for vertical movement within the carriage and wherein
(h) a single prime mover drives both said work support up and down in a vertical plane while causing said carriage to be driven in a horizontal plane along said track.

3. For use with a plurality of treatment stations and a static frame, an article elevating and horizontal traversing carriage comprising
(a) a main self-propelled carriage frame movably carried by said static frame,
(b) an article carrying work support carried by said main carriage frame for vertical movement up and down therein,
(c) article pick-up means on said work support for selectively engaging and disengaging said articles to be processed,
(d) and drive means on said main carriage connected to selectively elevate and lower said bracket up and down in said main frame and to drive said main frame along said static frame when said work support means is in the fully elevated position with respect to said main carriage.

4. A device as claimed in claim 3 further comprising
(e) coupling means between said drive means and said elevating means for selectively coupling the horizontal propulsion of the carriage to the prime mover or the vertical elevation of the work support to the prime mover, said drive means being a single motor.

5. A device as claimed in claim 4 wherein said coupling means is fixed against rotation but movable in the axial direction of said drive means.

6. A device as claimed in claim 3 wherein said drive means is a shaft vertically arranged in said main carriage and having
(e) an endless worm along a portion of its length about which is driven
(f) a block connected to said work support whereby said work support is elevated and lowered dependent upon the direction of rotation of said worm shaft and
(g) a horizontal drive gear is driven by said shaft to a coupling device whereby said coupling device may selectively connect either the worm portion of the shaft or the gear for driving engagement.

7. A device as claimed in claim 3 wherein said work support is
(e) an arm in the form of a sleeve member rotatably carried upon
(f) a rod secured to a
(g) block for movement up and down within the main carriage frame,
(h) said sleeve having work engaging hooks secured thereto and having
(i) means for rocking said hooks and sleeve about said rod to selectively engage and disengage work to be processed.

8. For use with a static frame alongside of which is arranged a plurality of treatment stations,
(a) a main carriage frame,
(b) work support means carried by said main carriage frame for vertical movement up and down therein,
(c) a shaft carried said frame and journaled for rotation therein,
(d) an endless worm shaft concentric with said first shaft and rotatable independently of said first shaft,
(e) a drive motor for driving said first shaft and for imparting unidirectional drive to an overrunning clutch, said worm shaft being connected to be driven by the output of said overrunning clutch whereby upon rotation of said motor in one direction the carriage will be propelled horizontally and the worn shaft will remain stationary together with its work carrying support and whereby upon reversal of the direction of rotation of said motor the horizontal drive shaft will be disabled and said worm shaft will be actuated to compel movement therealong of a
(f) worm block secured to said work support for raising and lowering said work support.

9. For use with a system for processing plants having treatment stations and a rail associated therebeside, a work conveyor appartus comprising
(a) a movable self-propelled carriage on said rail,
(b) an automatically reversible motor on said carriage,
(c) a work carrier mounted on said carriage for up and down movement therein, and
(d) means selectively coupling said motor to drive said carriage along said rail in one position of coupling and to raise and lower said work carrier in the other position of coupling.

10. A system as claimed in claim 9 further comprising
(e) a limit switch on said carriage in circuit with said motor, and
(f) a limit switch positioned to be actuated by said work carrier and which upon both limit switches being actuated effect reversal of said motor.

References Cited in the file of this patent

FOREIGN PATENTS

| | | |
|---|---|---|
| 1,215,758 | France | Apr. 20, 1960 |
| 1,246,514 | France | Oct. 10, 1960 |